(12) United States Patent
Ratnakar

(10) Patent No.: US 10,122,845 B2
(45) Date of Patent: Nov. 6, 2018

(54) LOCATION BASED PERSONAL ORGANIZER

(76) Inventor: Nitesh Ratnakar, Elkins, WV (US)

( * ) Notice: Subject to any disclaimer, the term of this patent is extended or adjusted under 35 U.S.C. 154(b) by 246 days.

(21) Appl. No.: 12/046,358

(22) Filed: Mar. 11, 2008

(65) Prior Publication Data

US 2008/0186226 A1 Aug. 7, 2008

(51) Int. Cl.
*G06F 17/30* (2006.01)
*H04M 1/725* (2006.01)
*H04M 1/2745* (2006.01)

(52) U.S. Cl.
CPC ..... *H04M 1/72572* (2013.01); *G06F 17/3087* (2013.01); *G06F 17/30867* (2013.01); *H04M 1/274508* (2013.01); *H04M 1/72566* (2013.01); *H04M 2250/10* (2013.01)

(58) Field of Classification Search
CPC .............. G06F 17/289; G06F 13/385; G06F 17/30241; G06F 2213/3814; G06F 17/30209; G06F 17/30554; G06F 17/3087; G06F 17/3089; G06F 3/04817; G06F 8/00; G06F 8/31; G06F 8/41; G06F 17/30867; G06F 3/048
See application file for complete search history.

(56) References Cited

U.S. PATENT DOCUMENTS

| 5,654,908 | A | * | 8/1997 | Yokoyama | 708/109 |
| 7,398,081 | B2 | * | 7/2008 | Moran | 455/414.1 |
| 7,411,518 | B2 | * | 8/2008 | Ratnakar | 340/932.2 |
| 8,700,310 | B2 | * | 4/2014 | Jayanthi | 701/408 |
| 2002/0102988 | A1 | * | 8/2002 | Myllymaki | 455/456 |
| 2005/0131740 | A1 | * | 6/2005 | Massenzio et al. | 705/2 |
| 2006/0058948 | A1 | * | 3/2006 | Blass et al. | 701/207 |
| 2007/0271367 | A1 | * | 11/2007 | Yardeni et al. | 709/223 |
| 2009/0210148 | A1 | * | 8/2009 | Jayanthi | 701/206 |
| 2009/0222482 | A1 | * | 9/2009 | Klassen et al. | 707/104.1 |

* cited by examiner

*Primary Examiner* — Dinku Gebresenbet
(74) *Attorney, Agent, or Firm* — Judong Ma

(57) ABSTRACT

Present invention discloses a location specific personal organizer system for communication devices. Personal organizer, as a combined application with contact list of communication device or as a stand alone application; is provided with means to link task with anticipated location and corresponding GPS coordinates. Means is provided in GPS enabled communication device to determine if any task in personal organizer is due at its current location. Task due at current location is displayed on communication device. According to another aspect of the invention means is disclosed to auto fill information into data fields of contact list entry in communication device in response to information provided in a unique identifier data field of contact list entry.

18 Claims, 7 Drawing Sheets

Contact List

| S No. | Name | Address | City | State | Zip | Phone | Fax | URL | GPS | Task |
|---|---|---|---|---|---|---|---|---|---|---|
| Business 1 | abc | 12 xyz | cde | wv | 23221 | 233 2 | 222 | Sd.com | | |
| Business 2 | | | | | | | | | | |
| Business 3 | | | | | | | | | | |
| Business N | | | | | | | | | | |

| S No. | Name | Address | City | State | Zip | Phone | Fax | URL | GPS | Task |
|---|---|---|---|---|---|---|---|---|---|---|
| Business 1 | abc | 12 xyz | cde | wv | 23221 | 233 2 | 222 | Sd.com | X,y,z | |
| Business 2 | | | | | | | | | | |
| Business 3 | | | | | | | | | | |
| Business N | | | | | | | | | | |

LOCATION BASED PERSONAL ORGANIZER

FIELD OF INVENTION

The present invention relates to personal organizer system and contact list of communication devices.

BACKGROUND AND PRIOR ART

Address book and personal organizer are two most common features used in personal communication devices such as mobile phones. Address book provides users means to store contact information of businesses and individuals. Usually address book provides users means to store contact information such as name, address, phone, fax, email, web site etc. In addition most modern personal communication devices enable speed dial of phone numbers contained in entry of address book. Personal organizer provides users means to enter planned tasks according to anticipated time of execution of corresponding tasks. Usually users are able to enter anticipated tasks into the personal organizer according to anticipated time of task i.e. date, day of the week, year, hour and minute etc. Most personal organizer systems have alarm feature to remind users of a task at a time prior to entered time of task as selected by user. However, another important feature applicable to any task i.e. location of anticipated task is not incorporated in any personal organizer system currently in use. Although personal organizer systems currently in use are able to remind users of tasks as a function of time, this sometimes is not useful as user is not present at the location of task at the time of reminder and hence is unable to execute said task. Moreover many tasks are location critical as opposed to time critical. For example user may want to be reminded to purchase milk when user is in a grocery store, irrespective of the time. Hence there remains a need for personal organizer system that enables user to be reminded of task as a function of location of user.

SUMMARY

Present invention discloses a GPS enabled contact list for communication devices. Means is provided in communication device to integrate GPS coordinates corresponding to physical address contained in its contact list. Personal organizer, as a combined application with contact list or as a stand alone application; is provided with means to link task with its anticipated location and corresponding GPS coordinates. Means is provided in GPS enabled communication device to determine if any task in personal organizer is due at its current location. Task due at current location is displayed on communication device. According to another aspect of the invention means is disclosed to auto fill information into data fields of contact list entry in communication device in response to information provided in a unique identifier data field of contact list entry.

DETAIL DESCRIPTION OF DRAWINGS

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out one or several purposes of the present invention. It is important, therefore, that the claims be regarded as including such equivalent constructions insofar as they do not depart from the spirit and scope of the present invention.

Figure 1:
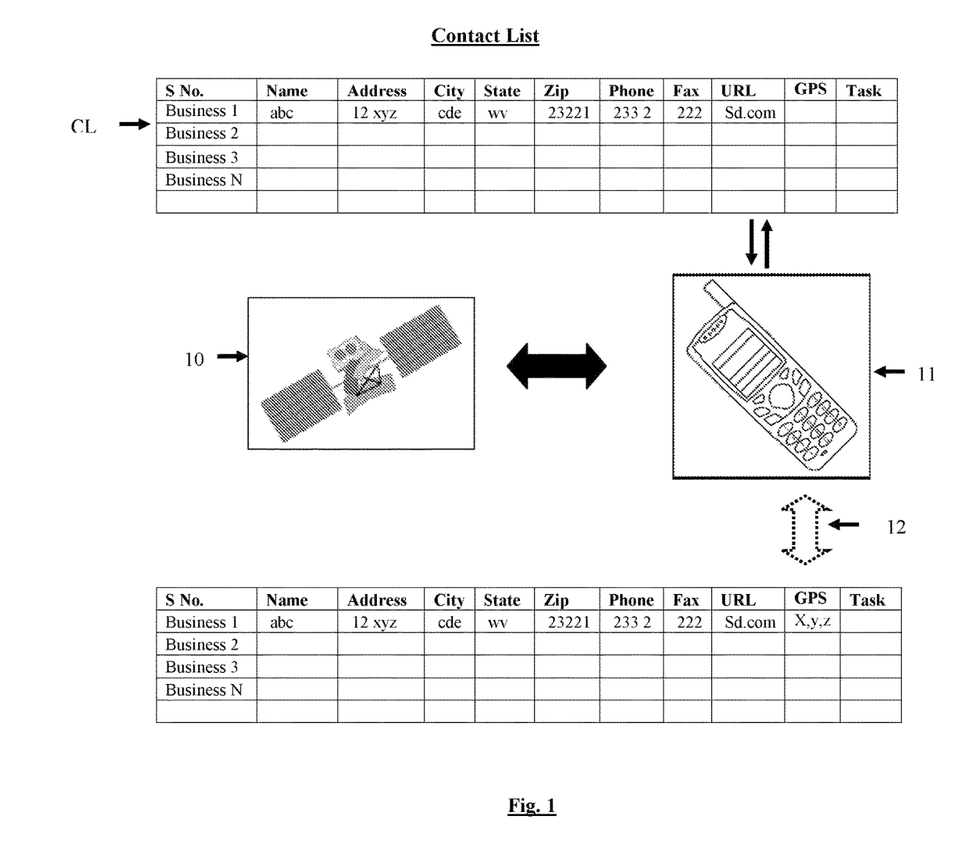
FIG. 1 shows first method of determination of GPS coordinates corresponding to physical address contained in contact list of communication device.

Many personal communication devices, such as cellular phones come equipped with global positioning system (GPS) receiver which enables users determine their location. The location of communication device is determined by GPS via communication link with GPS Satellite and is represented as GPS coordinates. Additionally, by means of geo-coding, physical address corresponding to GPS coordinates can easily be determined. Other means of determining location of communication devices is also available, such as cellular tower location determination. As shown in FIG. 1, According to one aspect of the invention contact list (CL) is provided in communication device with means for users to enter contact information of individuals and businesses. Each contact list entry in contact list has data fields for name, physical address, phone, fax, email address, and web site URL. Additionally data field for entry of location specific task list is also provided in the contact list. According to one method, information in data fields of contact list entry, including physical address, is manually filed in by user. Additionally, as shown in FIG. 1, contact list contains data field for GPS coordinates corresponding to physical address of entity contained therein. According to one method, also shown in FIG. 1, means is provided for communication device (11) equipped with GPS receiver to communicate with GPS Satellite (10); and determine GPS coordinates corresponding to physical address contained in contact list entries (12); and subsequently save GPS coordinates in GPS data field of corresponding contact list entries. In communication devices without GPS receiver, GPS coordinates corresponding to physical address contained in contact list can be obtained from one of existing providers via a web server.

Figure 2:
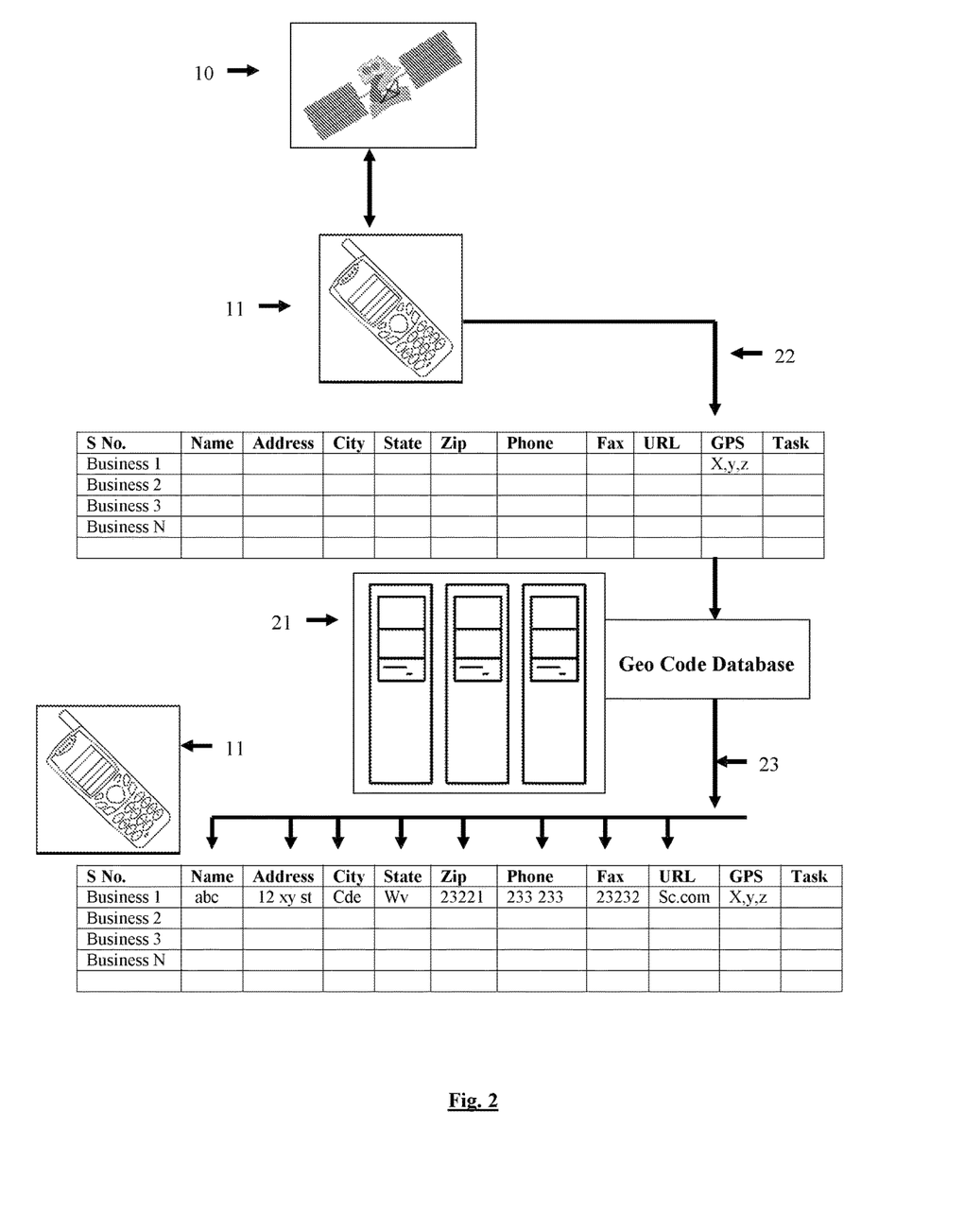
FIG. 2 shows a method of generation of contact list entry in contact list of communication device upon determination of GPS coordinates corresponding to current location of communication device.

According to another aspect of the invention as shown in FIG. 2 means is provided in communication device (11) to determine and save GPS coordinates corresponding to current location of communication device (11) in a new contact list entry; preferably upon instruction by user (22). Additionally, as shown in FIG. 2, means is provided in communication device (11) to determine physical address corresponding to GPS coordinates of current location of communication device (11) by means of geo coding; and save physical address location information into corresponding contact list entry (23). Physical address corresponding to GPS coordinates can be obtained from web server (21) containing geo-code database. Preferably, means is also provided to determine contact information corresponding to other contact list data fields such as name, phone, fax, email address, web site URL etc. (23) corresponding to GPS coordinates of current location of communication device; also from web server (21) containing geo-code database. For example; user standing inside of Wal-Mart in Elkins, W. Va. wants to save contact information of said Wal-Mart store in communication device. According to teachings of present invention, GPS coordinates corresponding to Wal-Mart store in Elkins, W. Va. is determined by GPS receiver of communication device and stored as new contact list entry. Physical address and other contact list data field information corresponding to GPS coordinates is determined by means of geo-coding and retrieved from web server and saved in corresponding contact list entry in communication device. Preferably, contact information database in web server (21) and contact list database in communication device (11) have identical structure.

Figure 3:
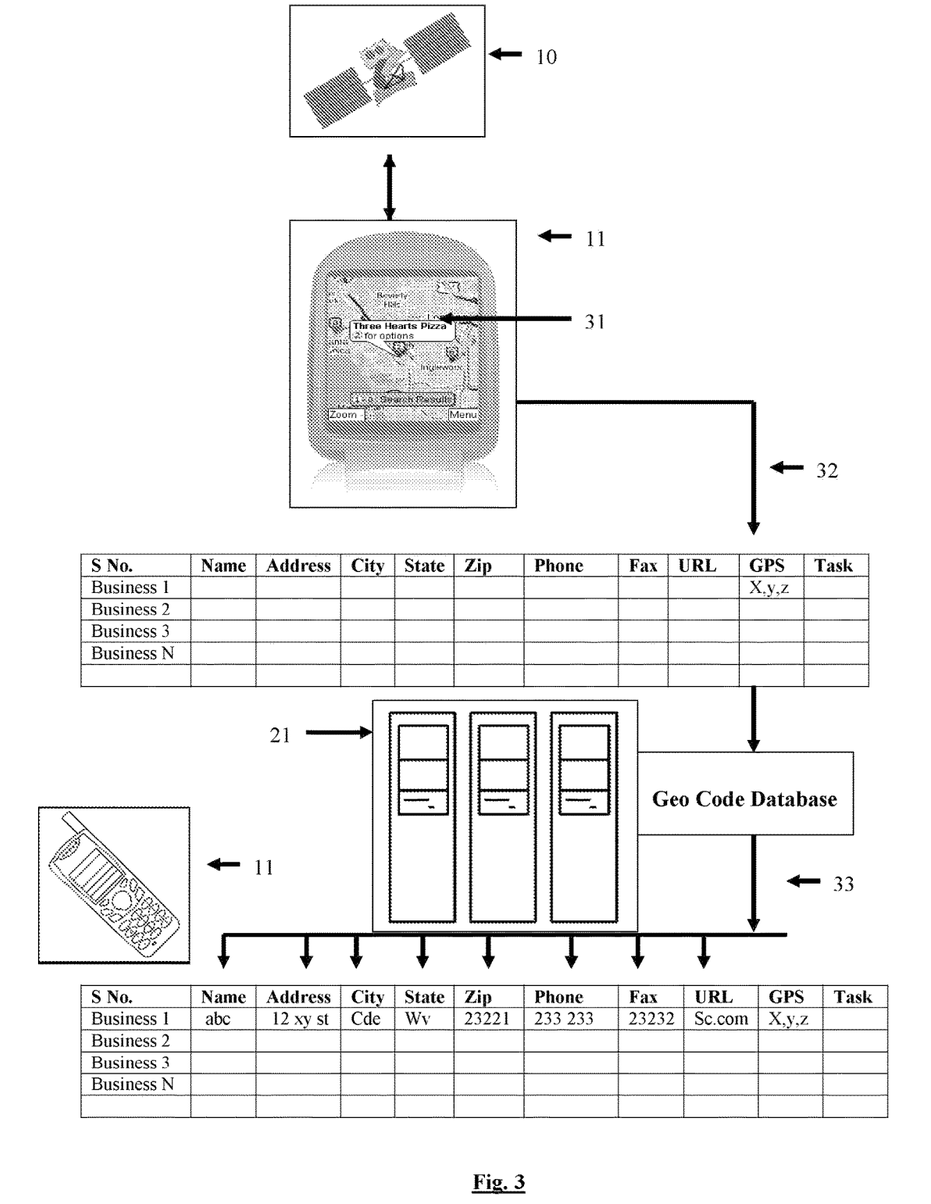
FIG. 3 shows a method of generation of GPS enabled contact list entry in contact list of communication device corresponding to GPS coordinates of a select location on local map displayed on communication device.

According to another aspect of the invention, shown in FIG. 3, means is provided in communication device (11) to display local map (31). User is provided means to choose a point of interest on local map. Preferably communication device (11) is GPS enabled and means is provided in communication device (11) to determine GPS coordinates corresponding to point of interest on local map and thereafter save GPS coordinates into GPS data field of contact list entry in communication device (32). Physical address corresponding to GPS coordinates is determined by means of geo coding (33) from geo code database contained in a web server (21). The geo code information is thereafter transmitted from web server and saved into corresponding data fields in corresponding contact list entry in communication device (33). In addition to physical address, means is also provided to determine additional contact information data corresponding to point of interest on local map such as name, phone, fax, email address, web site URL etc. and subsequently transmit and save additional contact information data into corresponding data fields of corresponding contact list entry (33). Preferably, additional contact information data is also obtained from remote web server housing geo-code database. For example user may choose a point of interest on local map that corresponds to the location of Wal-Mart in Elkins, W.V. According to teachings of the invention, GPS coordinates corresponding to point of interest on local map i.e. Wal-Mart store in Elkins, W.V. is determined at the level of communication device and saved in GPS data field of new contact list entry. Subsequently, physical address and other contact information data corresponding to GPS coordinates of point of interest on local map i.e. Wal-Mart in Elkins, W.V. is retrieved from geo code database saved in web server and thereafter saved in corresponding data fields of corresponding contact list entry in communication device. Preferably, contact information database in web server (21) and contact list database in communication device (11) have identical structure.

Figure 4:
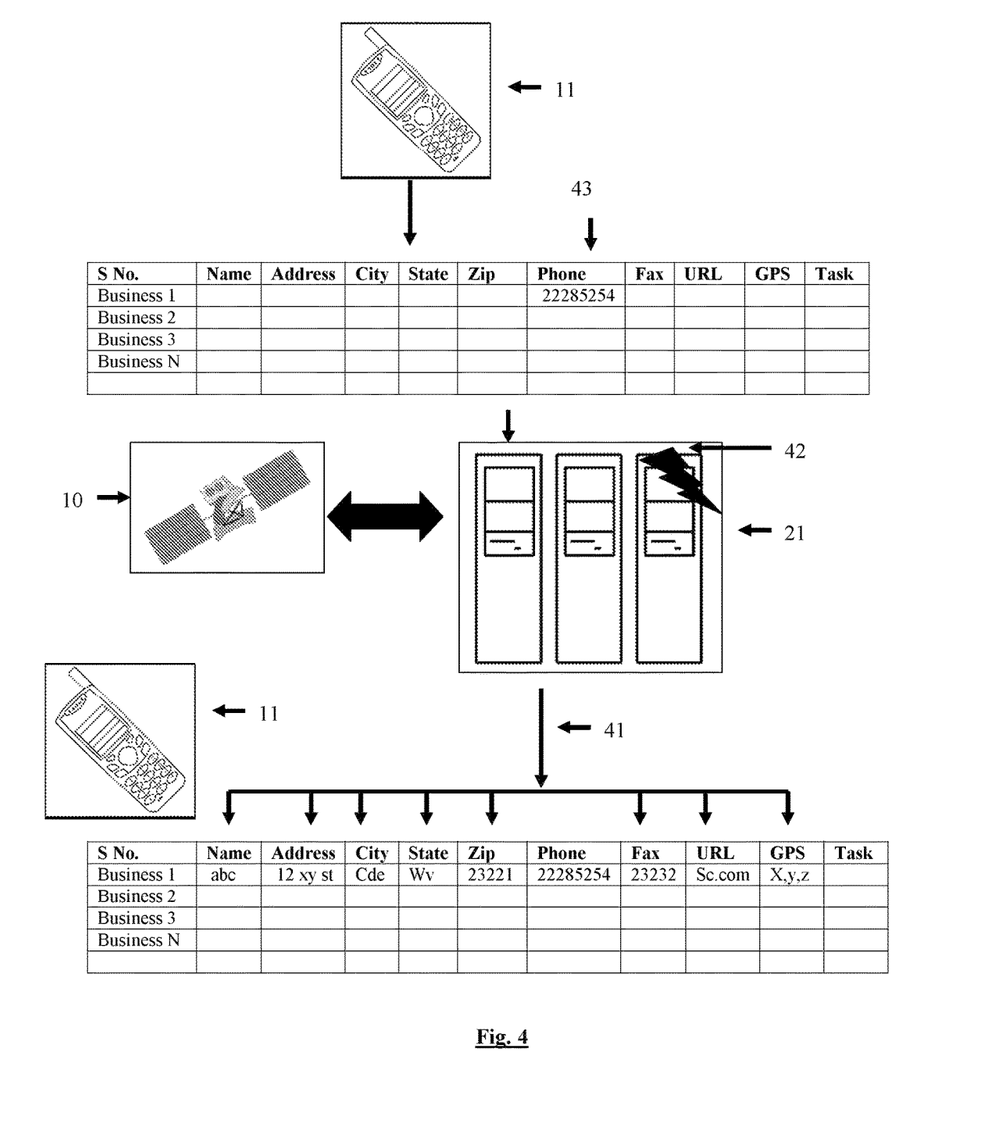
FIG. 4 shows a method of generation of GPS enabled contact list entry in contact list of communication device subsequent to entry of a unique identifier corresponding to entity, such as phone number, into a contact list entry in communication device; and subsequent retrieval of other corresponding contact information data including GPS coordinates from web server.

According to another method of invention, as shown in FIG. 4, contact information database of individuals and businesses is saved in web server (21). Web server (21) is equipped with GPS receiver (42). Means is provided in web server to determine GPS coordinates corresponding to physical addresses saved in contact information database contained therein; and save GPS coordinates into GPS data field of contact list entry of corresponding entity. At the level of communication device (11), means is provided for user to enter unique identifier information for an entity, such as phone number, into corresponding data field of a new contact list entry (43). Subsequently, other contact information data; i.e. physical address, fax, email etc.; and GPS coordinates corresponding to location of entity is automatically downloaded from web server into corresponding data fields of corresponding contact list entry in communication device (41). Preferably, contact information database in web server (21) and contact list database in communication device (11) have identical structure.

Figure 5:
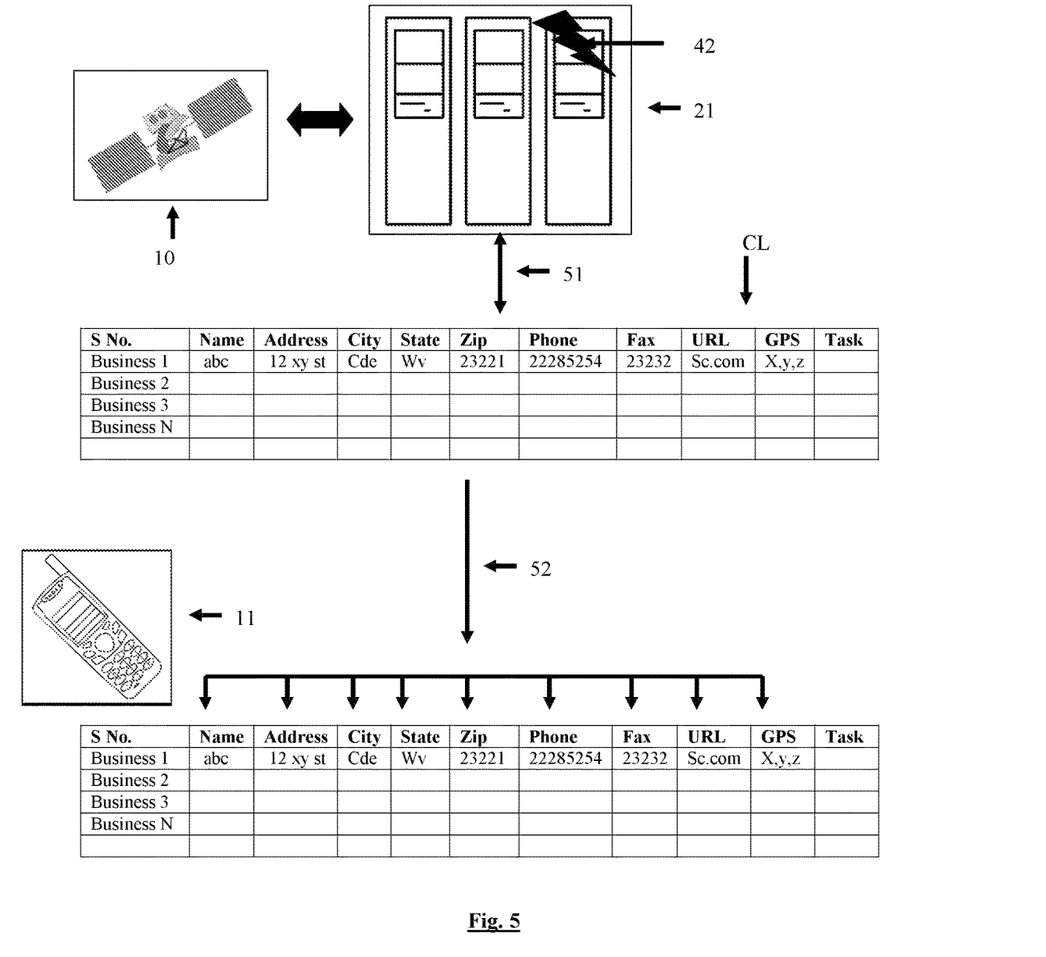
FIG. 5 shows a method of generation of GPS enabled contact list entry in contact list of communication device by means of download of GPS enabled contact information database from web server and subsequent integration with contact information database of communication device.

According to yet another method, as shown in FIG. 5, contact information database (CL) of businesses and individuals is saved in a web server (21). Web server (21) is equipped with GPS receiver (42). Means is provided in web server (21) to determine and save GPS coordinates corresponding to physical addresses contained in contact information database saved therein. Preferably, GPS coordinates of an entity is saved in the GPS data field of corresponding contact list entry. At the level of communication device (11), user is provided means to download contact information of select or all entities from web server into contact list database in communication device (52). Preferably, contact information database (CL) in web server (21) and contact list database in communication device (11) have identical structure. In addition to contact information, GPS coordinates corresponding to entities saved in remote web server is also downloaded and saved into GPS data field of corresponding contact list entries in communication device (52)

Figure 6:
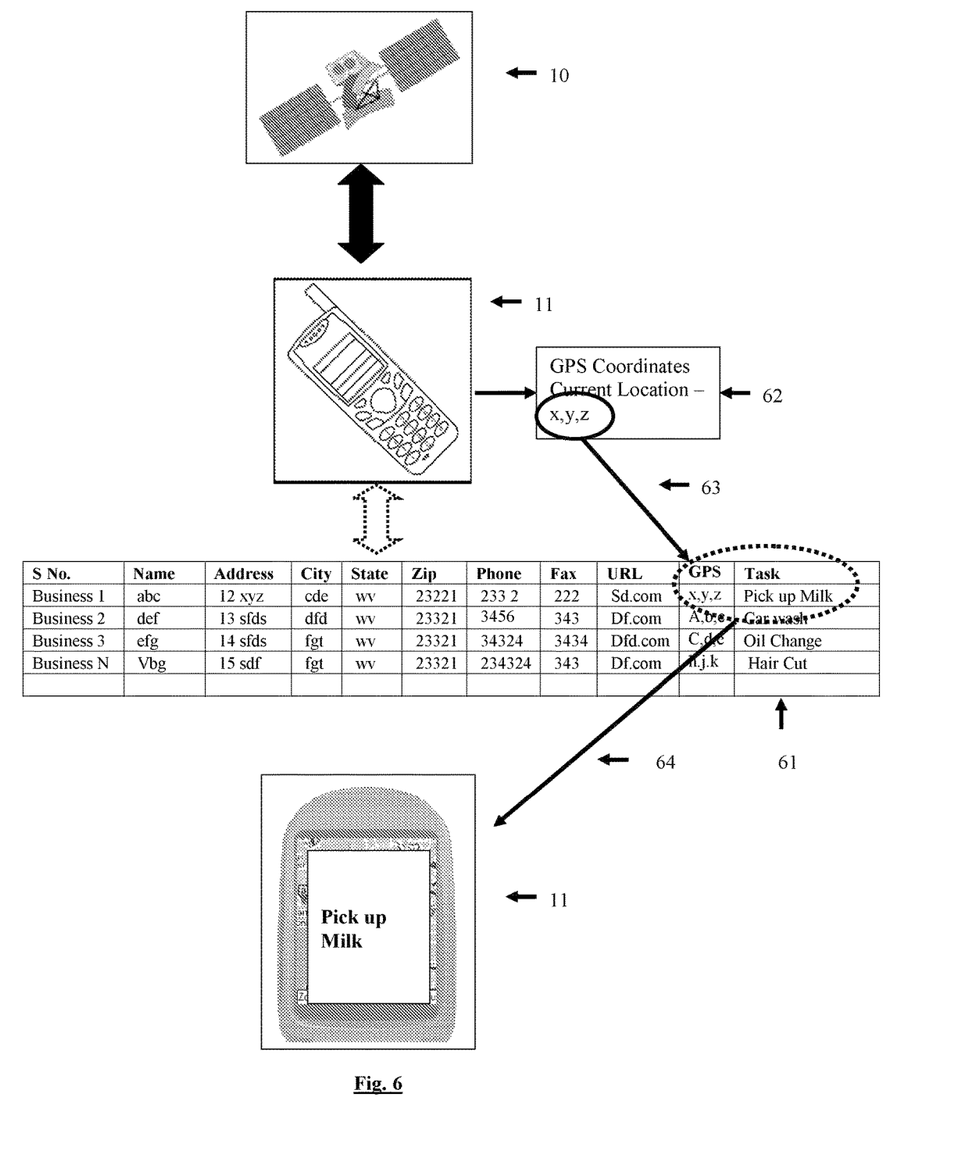
FIG. 6 shows the workings of GPS enabled contact list combined with personal organizer in communication device wherein user is automatically reminded of task when communication device is at the anticipated location of corresponding task.

As shown in FIG. 1, data field for entry of location specific task list is provided in contact list of communication devices. According to yet another aspect of the invention, as shown in FIG. 6, once contact information detail has been fed into the data fields of contact list of communication device by methods described in FIGS. 1-5, means is provided for users to enter location specific tasks into task list data field (61) of corresponding contact information entry. Preferably, means is provided to enter multiple task lists into a contact list entry. Preferably, task list entry can be one or more of text, audio, video, or image. Additionally, as shown in FIG. 6, means is provided in communication device to determine GPS coordinates of current location of communication device (62) and subsequently determine if current location GPS coordinates matches with GPS coordinates contained in one or more contact list entries saved therein (63). If current location GPS coordinates matches with GPS coordinates contained in one or more contact list entry, means is provided in communication device (11) to determine task list associated with said contact list entry (64). Additionally, means is provide in communication device (11) to display said task list as reminder to user. Means is provided for user to delete or edit task list contained in contact list entry once said task has been completed.

Figure 7:
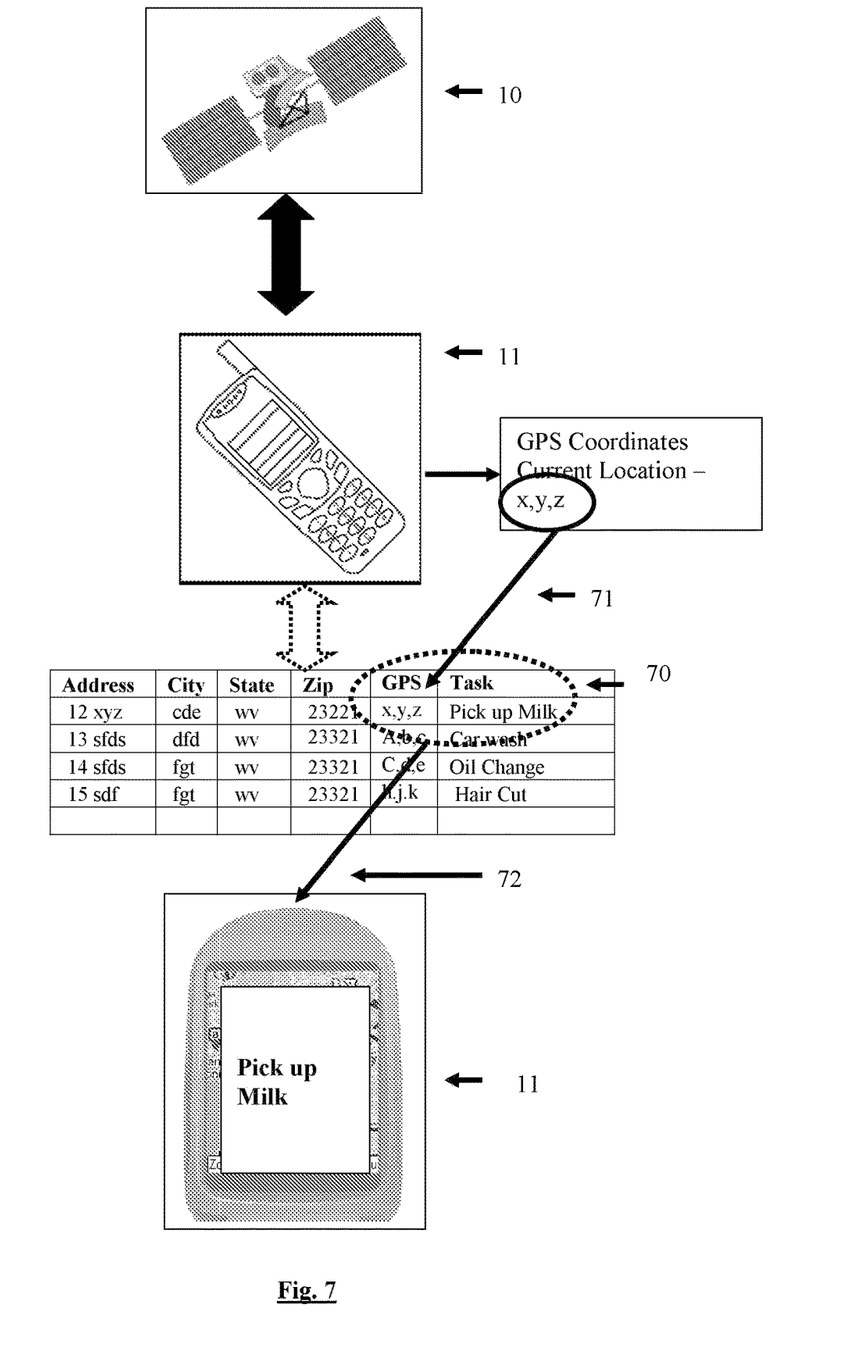
FIG. 7 shows the workings of a GPS enabled personal organizer in communication device wherein user is automatically reminded of task when communication device is at the anticipated location of corresponding task.

According to another aspect of the invention, location based personal organizer system is provided independent of contact list of communication device. According to this method, as shown in FIG. 7, as personal organizer system is provided with means for users to enter task list and anticipated location of tasks contained therein (70). Preferably task entry into contact list can be one or more of text, audio, video, or image. Anticipated location of task list can be entered into personal organizer; 1) manually; 2) by determining current location of communication device, preferably by means of GPS receiver integrated with communication device (this method is particularly applicable when anticipated location of future task corresponds to current location of communication device); and 3) choosing a location on local map displayed on communication device corresponding to anticipated location of a task. In all the above methods, GPS coordinates corresponding to anticipated location of task list is saved with corresponding task list in personal organizer. Preferably, communication device is equipped with GPS receiver in communication link with GPS satellite; and means is provided in communication device (11) to obtain GPS coordinates corresponding to anticipated location of tasks entered into the tasks list. Alternatively, GPS coordinates corresponding to physical addresses contained in task list of communication device can be obtained by means of communication link with web server containing GPS coordinates database. Additionally, as shown in FIG. 7, means is provided in communication device (11) to determine GPS coordinates of current location of communication device and subsequently determine if current location GPS coordinates matches with GPS coordinates contained in one or personal organizer entries (71). If current location GPS coordinates matches with GPS coordinates contained in one or more personal organizer entry, means is provided in communication device to determine corresponding task list (71&72). Additionally, means is provide in communication device (11) to display said task list as reminder to user. Means is provided for user to delete or edit task list contained in personal organizer entry once said task has been completed.

The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out one or several purposes of the present invention. It is important, therefore, that the claims be regarded as including such equivalent constructions insofar as they do not depart from the spirit and scope of the present invention. Some variations of the invention may include: 1) In addition to GPS coordinates, other method of localization of communication device, such as determination of location of cellular tower can be used; 2) although in description cellular phone has been illustrated as an example of communication device, other forms of communication device such as PDA, pager, landline phone, personal computer and other GPS enabled devices should also be considered inclusive; 3) In addition to task list being textual, it can also be in image, audio and video formats. The above list is for illustration purposes only and should in no way be considered all inclusive or limiting.

I claim:

1. A method for providing location-based notifications using a communicable mobile device equipped with an on-board GPS device and a server having access to a geo-code database, the geo-code database storing contact information linked to geographical locations such that each set of GPS coordinates corresponding to a geographical location is mapped to a set of contact information corresponding to the geographical location, the mobile device communicatively coupled to the server, the mobile device storing a contact list including one or more geo-based contact entries each containing a set of contact fields including a GPS coordinate field storing a set of GPS coordinate values corresponding to a geographical location, the method comprising:

the mobile device, in setting up a contact entry in the contact list, receiving at least a value for at least a first contact field of the contact entry from a first input means of the mobile device;

the mobile device sending to the sever the first contact field and the inputted value for the first contact field;

the mobile device receiving from the server respective values for at least a subset of the remaining contact fields of the contact entry retrieved from the geo-code database, such that upon the receiving from the server, the set of GPS coordinate values for the GPS coordinate field of the contact entry and a value for at least one other contact field of the contact entry are stored in the contact entry;

the mobile device receiving description of a task linked to the contact entry from a second input means of the mobile device;

the mobile device displaying the task description so as to notify of potential execution of the task when a set of contemporaneous GPS coordinates of the mobile device corresponding to the contemporaneous geographical location of the mobile device, as captured by the on-board GPS device, correspond to the stored set of GPS coordinate values for the GPS coordinate field of the contact entry.

2. The method of claim 1, wherein each contact entry of the contact list includes one or more fields defining a physical address.

3. The method of claim 1, wherein the at least first contact field of the contact entry includes a field defining a phone number.

4. The method of claim 1, wherein the at least first contact field of the contact entry includes the GPS coordinate field of the contact entry.

5. The method of claim 4, wherein the first input means includes means for displaying a local map and selecting a location on the displayed local map so as to input a set of GPS coordinate values corresponding to the selected location for the GPS coordinate field of the contact entry.

6. The method of claim 1, wherein the second input means includes a means for displaying a text input box enabling text describing a task to be inputted therein.

7. A system for providing location-based notification, the system comprising: a mobile device, the mobile device having an on-board GPS device and communicatively coupled to a server, the mobile device storing a contact list including one or more geo-based contact entries each containing a set of contact fields including a GPS coordinate field storing a set of GPS coordinate values corresponding to a geographical location; and the server having access to a geo-code database, the geo-code database storing contact information linked to geographical locations such that each set of GPS coordinates corresponding a geographical location is mapped to a set of contact information corresponding to the geographical location;

wherein the mobile device comprises a non-transitory computer readable medium carrying computer executable instructions adapted to perform, when executed by a processor, a set of steps comprising:

receiving, in setting up a contact entry in the contact list, at least a value for at least a first contact field of the contact entry from a first input means;

sending to the sever the first contact field and the inputted value for the first contact field;

receiving from the server respective values for the at least subset of the remaining contact fields of the contact entry, such that upon the receiving from the server, the set of GPS coordinate values for the GPS coordinate field of the contact entry and a value for at least one other contact field of the contact entry are stored as in the contact entry;

receiving description of a task linked to the contact entry from a second input means; and displaying the task description so as to notify of potential execution of the task when a set of contemporaneous GPS coordinates of the mobile device corresponding to the contemporaneous geographical location of the mobile device, as captured by the on-board GPS device, correspond to the stored set of GPS coordinate values for the GPS coordinate field of the contact entry; and wherein the server comprises a non-transitory computer readable medium carrying computer executable instructions adapted to perform, when executed by a processor, a set of steps comprising:

receiving from the mobile device the first contact field and the inputted value of the first contact field;

retrieving from the geo-code database the respective values for the at least one subset of the remaining contact fields of the contact entry; and sending to the mobile device the retrieved respective values for the at least one subset of the remaining contact fields of the contact entry.

8. The system of claim 7, wherein each contact entry of the contact list includes one or more fields defining a physical address.

9. The system of claim 7, wherein the at least first contact field of the contact entry includes a field defining a phone number.

10. The system of claim 7, wherein the at least first contact field of the contact entry includes the GPS coordinate field.

11. The system of claim 10, wherein the first input means includes means for displaying a local map and selecting a location on the displayed local map so as to input a set of GPS coordinate values corresponding to the selected location for the GPS coordinate field of the contact entry.

12. The system of claim 7, wherein the second input means includes a means for displaying a text input box enabling text describing a task to be inputted therein.

13. A mobile device for providing location-based notifications, the mobile device communicatively coupled to a server having access to a geo-code database, the geo-code database storing contact information linked to geographical locations such that each set of GPS coordinates corresponding to a geographical location is mapped to a set of contact information corresponding to the geographical location, the mobile device comprising:

an on-board GPS device;

a personal organizer module storing a contact list including one or more geo-based contact entries each containing a set of contact fields including a GPS coordinate field storing a set of GPS coordinate values corresponding to a geographical location; and a non-transitory computer readable medium carrying computer executable instructions adapted to perform, when executed by a processor, a set of steps comprising:

receiving, in setting up a contact entry in the contact list, at least a value for at least a first contact field of the contact entry from a first input means;

sending to the sever the first contact field and the inputted value for the first contact field;

receiving from the server respective values for the at least subset of the remaining contact fields of the contact entry, such that upon the receiving from the server, the set of GPS coordinate values for the GPS coordinate field of the contact entry and a value for at least one other contact field of the contact entry are stored as in the contact entry;

receiving description of a task linked to the contact entry from a second input means of the mobile device; and displaying the task description so as to notify of potential execution of the task when a set of contemporaneous GPS coordinates of the mobile device corresponding to the contemporaneous geographical location of the mobile device, as captured by the on-board GPS device, correspond to the stored set of GPS coordinate values for the GPS coordinate field of the contact entry.

14. The mobile device of claim 13, wherein each contact entry of the contact list includes one or more fields defining a physical address.

15. The mobile device of claim 13, wherein the at least first contact field of the contact entry includes a field defining a phone number.

16. The mobile device of claim 13, wherein the at least first contact field of the contact entry includes the GPS coordinate field.

17. The mobile device of claim 16, wherein the first input means includes means for displaying a local map and selecting a location on the displayed local map so as to input a set of GPS coordinate values corresponding to the selected location for the GPS coordinate field of the contact entry.

18. The mobile device of claim 13, wherein the second input means includes a means for displaying a text input box enabling text describing a task to be inputted therein.

* * * * *